(12) United States Patent
He et al.

(10) Patent No.: US 8,826,452 B1
(45) Date of Patent: Sep. 2, 2014

(54) PROTECTING COMPUTERS AGAINST DATA LOSS INVOLVING SCREEN CAPTURES

(75) Inventors: Juan He, Nanjing (CN); Dibin Tang, Nanjing (CN); Jialai Zhu, Nanjing (CN); Laiqiang Ding, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 316 days.

(21) Appl. No.: 13/352,634

(22) Filed: Jan. 18, 2012

(51) Int. Cl.
*G06F 7/04* (2006.01)

(52) U.S. Cl.
USPC .......................................................... 726/27

(58) Field of Classification Search
USPC .................. 726/23, 24, 27–30, 21, 4; 713/165
See application file for complete search history.

(56) References Cited

U.S. PATENT DOCUMENTS

| | | | |
|---|---|---|---|
| 5,629,980 A | 5/1997 | Stefik et al. | |
| 5,781,550 A | 7/1998 | Templin et al. | |
| 5,884,025 A | 3/1999 | Baehr et al. | |
| 6,401,239 B1 | 6/2002 | Miron | |
| 6,606,744 B1 | 8/2003 | Mikurak | |
| 6,629,081 B1 | 9/2003 | Cornelius et al. | |
| 6,671,818 B1 | 12/2003 | Mikurak | |
| 6,751,600 B1 | 6/2004 | Wolin | |
| 6,963,973 B2 | 11/2005 | Chapman et al. | |
| 6,981,262 B1 | 12/2005 | DeMello et al. | |
| 7,042,470 B2 | 5/2006 | Rhoads et al. | |
| 7,127,741 B2 | 10/2006 | Bandini et al. | |
| 7,131,141 B1 | 10/2006 | Blewett et al. | |
| 7,152,046 B2 | 12/2006 | Wang et al. | |
| 7,298,864 B2 | 11/2007 | Jones | |
| 7,356,188 B2 | 4/2008 | Venkatesan et al. | |
| 7,546,334 B2 | 6/2009 | Redlich et al. | |
| 7,574,449 B2 | 8/2009 | Majumder | |
| 7,624,435 B1 | 11/2009 | Huang | |
| 7,886,049 B2 | 2/2011 | Adelstein et al. | |
| 8,127,365 B1 | 2/2012 | Liu et al. | |
| 2002/0033844 A1 | 3/2002 | Levy et al. | |
| 2002/0099696 A1 | 7/2002 | Prince | |
| 2003/0005331 A1 | 1/2003 | Williams | |
| 2003/0065944 A1 | 4/2003 | Mao et al. | |
| 2004/0064537 A1 | 4/2004 | Anderson et al. | |
| 2004/0068543 A1 | 4/2004 | Seifert | |
| 2005/0066165 A1 | 3/2005 | Peled et al. | |
| 2005/0138353 A1 | 6/2005 | Spies et al. | |
| 2007/0101353 A1 * | 5/2007 | Jeong et al. ...................... 725/13 |
| 2007/0260872 A1 | 11/2007 | Filipi-Martin et al. | |
| 2012/0117660 A1 * | 5/2012 | Domany et al. .................. 726/28 |

OTHER PUBLICATIONS

Fast flux—from Wikipedia, the free encyclopedia, 2 sheets [retrieved on Nov. 16, 2009], retrieved from the internet: http://en.wikipedia.org/wiki/Fast_flux.
Cluster analysis—from Wikipedia, the free encyclopedia, 13 sheets [retrieved on Nov. 16, 2009], retrieved from the internet: http://en.wikipedia.org/wiki/Cluster_analysis.
Data loss prevention software—from Wikipedia, the free encyclopedia, 3 sheets [retrieved on Jan. 13, 2012], retrieved from the internet: http://en.wikipedia.org/wiki/Data_loss_prevention_software.

* cited by examiner

*Primary Examiner* — Beemnet Dada
(74) *Attorney, Agent, or Firm* — Okamoto & Benedicto LLP

(57) ABSTRACT

Disclosed are methods and apparatus for protecting computers from data loss involving screen capture. Screen capture events are detected in a computer. Documents that are visible on a computer screen are identified. Files of the visible documents are identified and scanned for sensitive data to determine whether the screen capture events are targeting contents of sensitive documents.

14 Claims, 4 Drawing Sheets

US 8,826,452 B1

PROTECTING COMPUTERS AGAINST DATA LOSS INVOLVING SCREEN CAPTURES

BACKGROUND OF THE INVENTION

1. Field of the Invention

The present invention relates generally to computer security, and more particularly but not exclusively to methods and apparatus for data loss prevention.

2. Description of the Background Art

Data loss prevention, also referred to as "data leakage prevention," refers to a computer security mechanism for securing sensitive data, and more particularly for preventing unauthorized theft or distribution of sensitive data. Sensitive data includes trade secrets, internal engineering documents, top secret documents, and other confidential information. Data loss prevention may involve intercepting a file from an email, network communication, or other means, and then scanning the file for sensitive data. Products that perform data loss prevention are commercially available from a variety of computer security vendors, including Trend Micro, Inc.

Embodiments of the present invention pertain to methods and apparatus that may be employed for data loss prevention applications. For example, embodiments of the present invention may be employed to improve the efficacy of currently available data loss prevention techniques.

SUMMARY

In one embodiment, a method of protecting a computer against data loss involving screen capture includes detecting a screen capture event in the computer. A first window that is visible on a computer screen of the computer and is a target of the screen capture event is identified. A file of a document displayed on the first window is identified. The file of the document displayed on the first window is scanned for sensitive data. The screen capture event is blocked when the document displayed on the first window is deemed sensitive based on the scanning of the file of the document displayed on the first window.

In another embodiment, a method of protecting a computer against data loss involving screen capture includes detecting a screen capture event in the computer. Windows that are visible on a computer screen of the computer and are a target of the screen capture event are identified. Files of documents displayed on the windows are identified. The files of the documents are scanned for sensitive data. The screen capture event is blocked when at least one of the documents contains sensitive data.

In another embodiment, a computer comprises a data storage device storing a file of a document, a display monitor having a computer screen displaying contents of the document, and a data loss prevention module comprising computer-readable program code loaded in a main memory and executed by a processor, the data loss prevention module being configured to detect a screen capture event targeting the contents of the document displayed on the computer screen and to scan the file of the document for sensitive data, and to block the screen capture event when the file of the document contains sensitive data.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
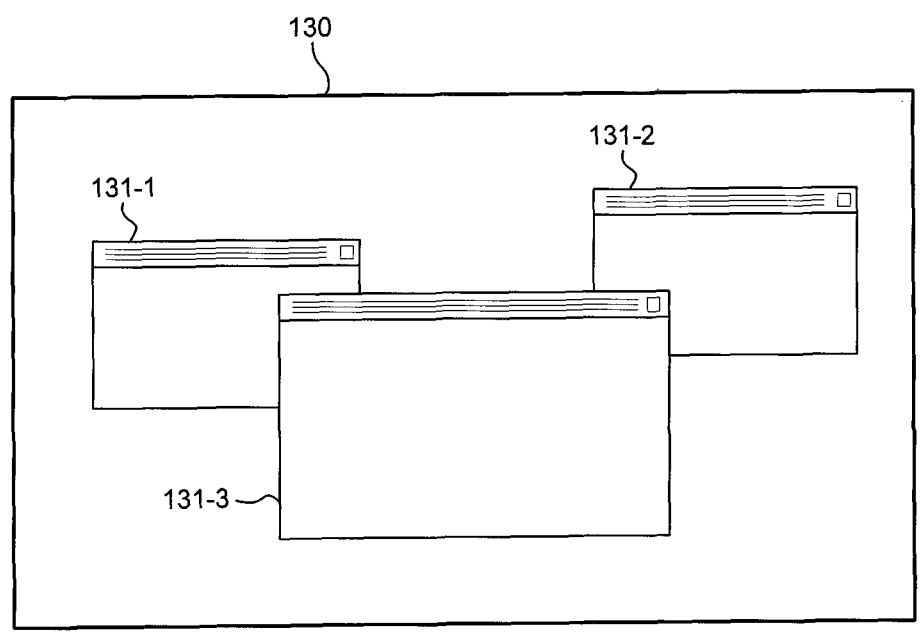
FIG. 1 shows an example of a computer screen of a display monitor.

FIG. 1 shows an example of a computer screen 130 of a display monitor. In the example of FIG. 1, the screen 130 displays windows 131 (i.e., 131-1, 131-2, 131-3) of application programs. To avoid being detected by a data loss prevention system, a data thief may perform a screen capture of a sensitive document. A screen capture, which is also referred to as "screen shot" or "print screen," generates an image of the screen of a display monitor. A screen capture may be performed by a keyboard command, such as by using a print screen key of a keyboard. In the example of FIG. 1, the data thief may perform a screen capture of the entire screen 130 to show the windows 131-1, 131-2, and 131-3. The data thief may also perform a screen capture of a particular window. For example, the data thief may perform a screen capture of only the window 131-3. The data thief may then send the image generated by the screen capture by e-mail or other electronic means. Generally speaking, an image is harder to process than text/characters, preventing the data loss prevention system from detecting that the image shows sensitive data of a sensitive document. A data loss prevention system may prevent data loss from screen captures by disabling the print screen key of a computer with sensitive documents.

Figure 2:
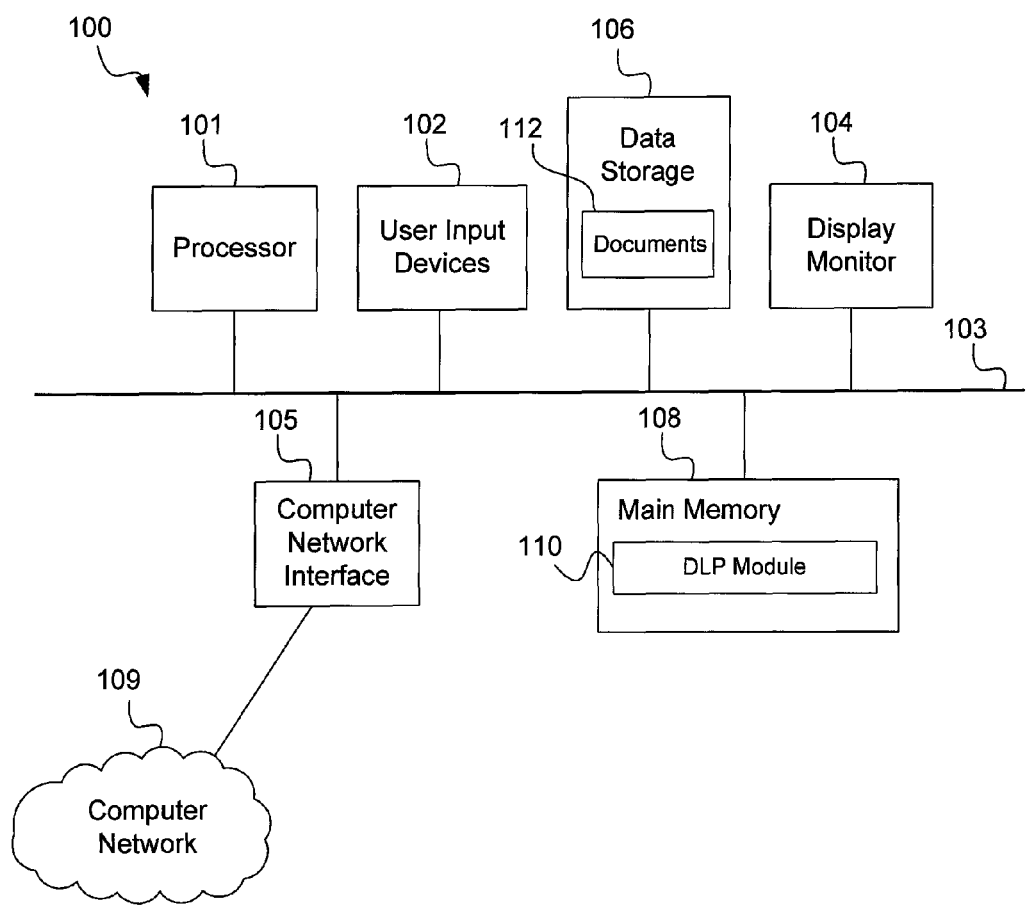
FIG. 2 shows a schematic diagram of a computer in accordance with an embodiment of the present invention.

Referring now to FIG. 2, there is shown a schematic diagram of a computer 100 in accordance with an embodiment of the present invention. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules stored non-transitory in the main memory 108 for execution by the processor 101. In the example of FIG. 2, the main memory 108 includes a data loss prevention module 110, which may be loaded from the data storage device 106 to the main memory 108. The data loss prevention module 110 may also be made available in other computer-readable medium including optical disk, flash drive, and other memory devices.

One or more documents 112 may be stored or made available in the computer 100. A document 112 may be a word processing document, for example. A document 112 may be stored as a computer file in the data storage 106 or other local (i.e. in the computer 100) or remote (i.e., outside of the computer 100, such as over a computer network) data storage. The contents of a document 112 may be displayed on the computer screen of the display monitor 104. For example, an application program (not shown) running in the computer 100 may open a document 112 to display contents of the document 112 on a window on the screen of the display monitor 104. This makes a sensitive document 112, i.e. a document 112 that contains sensitive data, vulnerable to data loss involving screen capture.

The data loss prevention module 110 comprises computer-readable program code for preventing data loss involving screen capture. In one embodiment, the data loss prevention module 110 is configured to detect a screen capture event, to identify documents visible on the computer screen, to identify files of the documents visible on the computer screen, and to scan the files of the documents visible on the computer screen for sensitive data to determine if any of the documents is a sensitive document.

The data loss prevention module 110 may be configured to perform a predetermined response action based on the result of the scanning of the files for sensitive data. For example, the data loss prevention module 110 may be configured to block the screen capture if any of the files contains sensitive data, meaning that at least one document on the computer screen and is a target of the screen capture may be displaying sensitive data. As another example, the data loss prevention module 110 may be configured to allow the screen capture if none of the files contains sensitive data. Yet another example, the data loss 110 may be configured to continue monitoring screen capture behavior if the data loss prevention module 110 cannot determine whether or not any of the files contains sensitive data.

Figure 3:
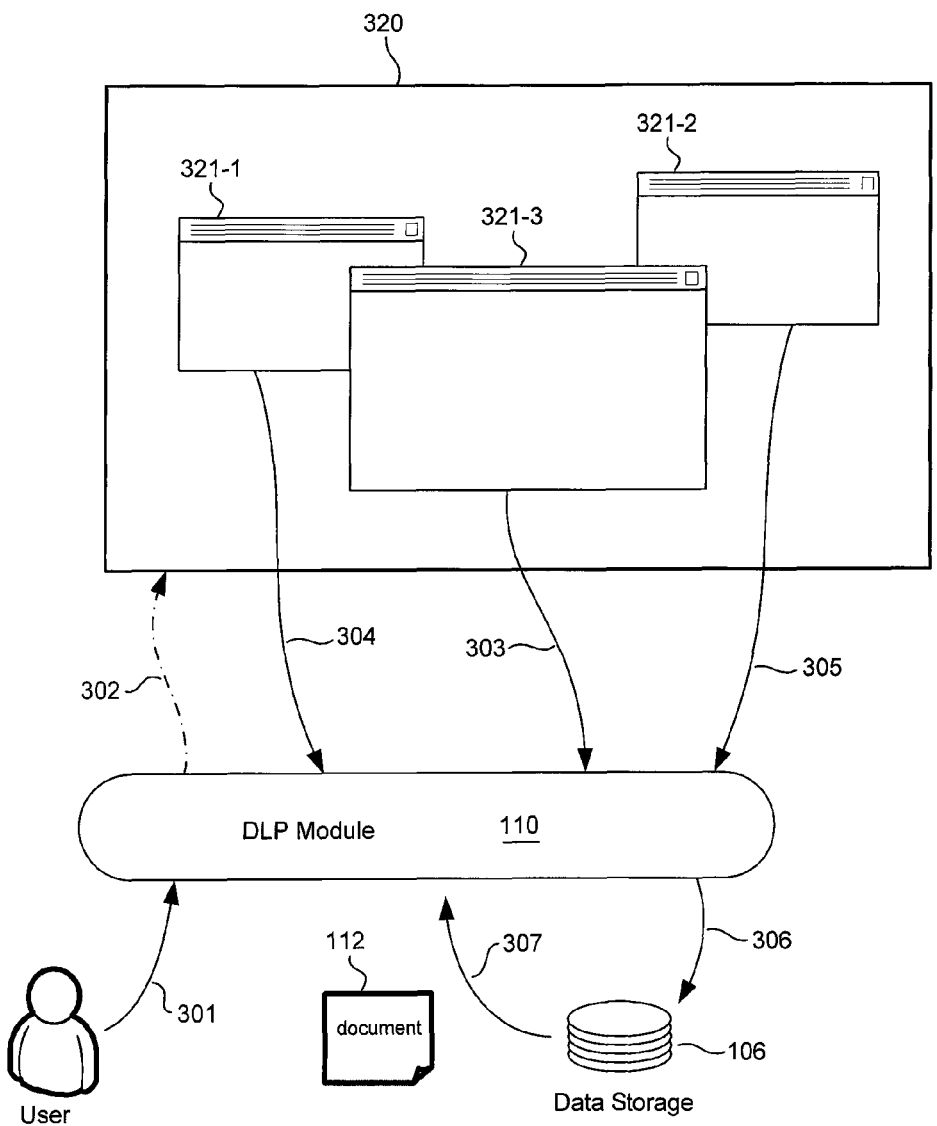
FIG. 3 shows a flow diagram schematically illustrating a method of preventing data loss involving screen capture in accordance with an embodiment of the present invention.

FIG. 3 shows a flow diagram schematically illustrating a method of preventing data loss involving screen capture in accordance with an embodiment of the present invention. The method of FIG. 3 is explained using the components of the computer 100 for illustration purposes only.

In the example of FIG. 3, a user initiates a screen capture event to generate an image of a computer screen 320 of the display monitor 104. The user may or may not be a data thief. The screen 320 displays windows 321 (i.e., 321-1, 321-2, 321-3) of application programs running in the computer 100. The windows 321 may be displaying currently open documents 112 of the application programs. For example, the window 321-3 may be the window of a word processing program and is displaying a word processing document.

The data loss prevention module 110 detects and intercepts the screen capture event (see arrow 301). The data loss prevention module 110 may detect and intercept the screen capture event using a keyboard hook or an application programming interface (API) hook, for example. The arrow 302 is drawn with a dashed line to indicate that the data loss prevention module 110 may or may not allow the screen capture depending on whether or not a sensitive document 112 is displayed on the screen 320. As a response action, the data loss prevention module 110 may block the screen capture if any of the documents 112 displayed on the screen 320 contains sensitive data as determined by scanning the corresponding files of the documents 112.

The data loss prevention module 110 identifies documents visible on the screen 320. In one embodiment, the data loss prevention module 110 identifies all windows 321 that are currently visible on the screen 320 and retrieves the file handles of the visible windows 321 (see arrows 303, 304, and 305). The file handles allow for identification of the files of the documents 112 displayed on the windows 321 (see arrow 306). The data loss prevention module 110 then scans the files of the documents 112 for sensitive data (see arrow 307) to determine if any of the documents 112 displayed on the screen 320 contains sensitive data.

In the example of FIG. 3, the data loss prevention module 110 accesses the files of the documents 112 from the local data storage 106 of the computer 100. As can be appreciated, the files of the documents 112 may also be accessed from another computer or centralized data storage. In that case, the data loss prevention module 110 accesses the files of the documents 112 over a computer network for scanning.

Figure 4:
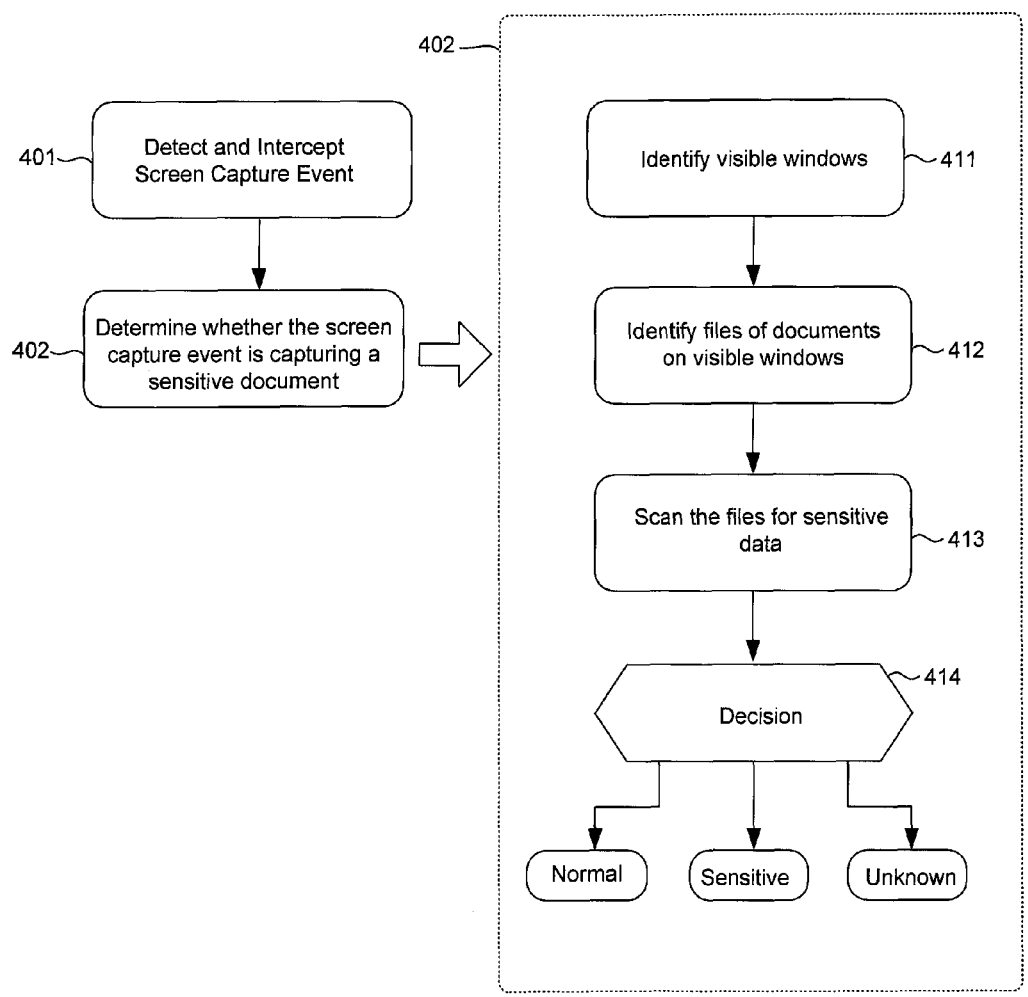
FIG. 4 shows a flow diagram of a method of preventing data loss involving screen capture in accordance with an embodiment of the present invention.

FIG. 4 shows a flow diagram of a method of preventing data loss involving screen capture in accordance with an embodiment of the present invention. The method of FIG. 4 is explained using the components of the computer 100 for illustration purposes only.

In the example of FIG. 4, the data loss prevention module 110 detects and intercepts a screen capture event (step 401). The data loss prevention module 110 determines whether or not the screen capture event is generating a screen capture image of a sensitive document (step 402).

In the example of FIG. 4, the step of determining whether or not the screen capture event is generating a screen capture of a sensitive document may be performed by steps 411-414. More specifically, the data loss prevention module 110 may identify windows that are visible on the screen of the display monitor 104 (step 411). The data loss prevention module 110 then identifies the files of documents displayed on the visible windows (step 412). The data loss prevention module 110 scans the files of the documents for sensitive data (step 413) to determine whether or not the screen shows sensitive data of a document. For example, the data loss prevention module 110 may scan the files of the documents for keywords indicative of sensitive data. The keywords may be weighted to allow for scoring of the files, and the scores may be compared to a threshold. Conventional data loss prevention algorithms may be employed to determine whether or not a file contains sensitive data without detracting from the merits of the present invention.

The data loss prevention module 110 may render a decision (see step 414) indicating whether a document is normal (i.e., not containing sensitive data), sensitive (i.e. containing sensitive data), or unknown (i.e., the data loss prevention module 110 cannot evaluate sensitivity of the document). The data loss prevention module 110 may perform a response action based on its decision. The data loss prevention module 110 may be configured to block the screen capture if it deems that at least one of the documents targeted by the screen capture is sensitive. The data loss prevention module 110 may be configured to allow the screen capture if it deems that all of the documents targeted by the screen capture are normal. The data loss prevention module 110 may be configured to continue monitoring screening capture events if at least one document targeted by the screen capture is unknown and all other documents targeted by the screen capture and can be evaluated are normal. In one embodiment, repeated occurrences of screen captures targeting unknown documents may be deemed suspicious and accordingly reported to an administrator or a backend support server for further analysis, for example. The report may include a number of times the screen captures are performed and the documents targeted by the screen captures.

As can be appreciated from the foregoing, embodiments of the present invention provide advantages heretofore unrealized. Compared to completely disabling screen captures, the embodiments provide a better user experience in that screen captures are allowed so long as the target of the screen captures does not include sensitive documents. The embodiments are also relatively difficult to bypass. The embodiments also support monitoring and further analysis of suspicious screen captures.

Methods and apparatus for preventing computers against data loss are disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting a computer against data loss involving screen capture, the method comprising:
   detecting and intercepting a screen capture event in a user computer, the screen capture event being initiated by a user by making a keyboard command from a keyboard of the user computer;
   identifying a first window that is visible on a computer screen of the user computer and is a target of the screen capture event;
   retrieving an attribute of the first window that is indicative of a file of a document displayed on the first window;
   identifying the file of the document displayed on the first window based on the attribute of the first window;
   scanning the file of the document displayed on the first window for sensitive data; and
   blocking the screen capture event when the document displayed on the first window is deemed sensitive based on the scanning of the file of the document displayed on the first window.

2. The method of claim 1 further comprising:
   allowing the screen capture event to proceed when the document displayed on the first window is deemed not sensitive based on the scanning of the file of the document displayed on the first window.

3. The method of claim 1 wherein the document displayed on the first window is a word processing document and a file of the word processing document is scanned for sensitive data.

4. The method of claim 1 further comprising:
   identifying a second window that is visible on the computer screen and is another target of the screen capture event;
   identifying a file of a document displayed on the second window;
   scanning the file of the document displayed on the second window for sensitive data; and
   blocking the screen capture event when the document displayed on the second window is deemed sensitive based on the scanning of the file of the document displayed on the second window.

5. The method of claim 4 further comprising:
   allowing the screen capture event to proceed when both the document displayed on the first window and the document displayed on the second window are deemed normal for not containing sensitive data.

6. The method of claim 1 wherein the file of the document displayed on the first window is accessed over a computer network for scanning for sensitive data.

7. A method of protecting a computer against data loss involving screen capture, the method comprising:
   detecting and intercepting a screen capture event in a user computer, the screen capture event being initiated by a user by making a keyboard command from a keyboard of the user computer;
   identifying windows that are visible on a computer screen of the user computer and are a target of the screen capture event;
   retrieving attributes of the windows that are indicative of files of documents displayed on the windows;
   identifying the files of the documents displayed on the windows based on the attributes of the windows;
   scanning the files of the documents for sensitive data; and
   blocking the screen capture event when at least one of the documents contains sensitive data.

8. The method of claim 7 further comprising:
   allowing the screen capture event to proceed when all of the documents do not contain sensitive data.

9. The method of claim 7 wherein at least one of the documents is a word processing document and a file of the word processing document is scanned for sensitive data.

10. The method of claim 7 wherein a file of least one of the documents is accessed over a computer network for scanning for sensitive data.

11. A user computer comprising:
    a data storage device storing a file of a document;
    a computer screen displaying a window with contents of the document;
    a keyboard employed by a user of the user computer to make a keyboard command to initiate a screen capture event targeting the window; and
    a data loss prevention module comprising computer-readable program code loaded in a main memory and executed by a processor of the user computer, the data loss prevention module being configured to detect and intercept the screen capture event targeting the window, to retrieve an attribute of the window indicative of the file of the document, to identify the file of the document based on the attribute of the window, to scan the file of the document for sensitive data, and to block the screen capture event when the file of the document contains sensitive data.

12. The computer of claim 11 wherein the document comprises a word processing document.

13. The computer of claim 11 wherein the data loss prevention module is configured to allow the screen capture event when the file of the document does not contain sensitive data.

14. The computer of claim 13 wherein the data loss prevention module is configured to continue monitoring for screen capture events when the data loss prevention module cannot ascertain whether or not the file of the document contains sensitive data.

* * * * *